July 16, 1963  S. W. LANGDON  3,097,462
PACKAGING MACHINE
Filed Feb. 6, 1961  4 Sheets-Sheet 2

FIG. 2

INVENTOR.
SAMUEL W. LANGDON
BY
*B. T. Schlesinger*
Attorney

July 16, 1963  S. W. LANGDON  3,097,462
PACKAGING MACHINE
Filed Feb. 6, 1961  4 Sheets-Sheet 3

INVENTOR.
SAMUEL W. LANGDON
BY
Attorney

July 16, 1963     S. W. LANGDON     3,097,462
PACKAGING MACHINE Filed Feb. 6, 1961     4 Sheets-Sheet 4

*INVENTOR.*
SAMUEL W. LANGDON
BY
*Attorney*

United States Patent Office 3,097,462
Patented July 16, 1963

3,097,462
PACKAGING MACHINE
Samuel W. Langdon, Rochester, N.Y., assignor to Reginald R. Kiefer, Fairport, N.Y.
Filed Feb. 6, 1961, Ser. No. 87,284
19 Claims. (Cl. 53—180)

This invention relates to a machine for wrapping packages, and more particularly to a machine for wrapping packages between two thin sheets of a transparent, synthetic wrapping material, such as polyethylene film, and for fusing the sheets of film together about each package.

In recent years manufactures have found that certain products appear to have more sales appeal for the consumer when the products are wrapped in transparent material, thus affording visual inspection of the product without having to remove the wrapping. Synthetic materials, such as polyethylene, polyvinylchloride, etc. which are easily produced in the form of thin, transparent, flexible sheets or films, that are heat-shrinkable, have the additional advantage that by passing a package wrapped in a film of such a material through a heat tunnel, for instance, the film can be shrunk around the package to hold the contents of the package securely in place. This is of particular benefit when packaging articles of irregular shape like potatoes, ears of corn, apples, and the like, but is useful also in packaging regular shaped articles, such as phonograph records, etc.

Most of the machines which have heretofore been employed in wrapping articles with transparent, synthetic film have been rather complex and nearly prohibitive in cost. This may be attributed in a large part to the fact that such machines have heretofore usually been constructed to completely enclose and seal the package within the synthetic wrapping material.

Because of the cost and complication of prior machines, therefore, the more general practice, in wrapping articles, or individual containers, in transparent synthetic wrappers, is to wrap the articles or individual containers by hand, and then heat seal the wrap around them. This is, however, a time-consuming method, and where any large quantity has to be wrapped, is costly. Moreover, in the case of certain packaged items it is unnecessary to wrap the package completely within a synthetic film. In the case of tomatoes, potatoes, onions, apples, etc. for instance, a perfectly satisfactory and economic wrap may be provided merely by placing the goods, which are to be wrapped, in an open top container and sealing a synthetic wrap around the goods and container along only two opposite ends of the container. While the wrapping material thus remains open or unsealed along the container's sides, it has nevertheless been found that such a wrap when shrunk on the goods and container, is perfectly adequate for the wrapping of almost all kinds of goods except those that must necessarily be enclosed within an air-tight wrap.

One object of the present invention is to provide a packaging machine for automatically wrapping packages in transparent synthetic material as the packages are conveyed successively through the machine.

Another object of this invention is to provide a machine which will automatically enclose a package within two sheets of heat-shrinkable synthetic material and seal the sheets together along two ends only of the package.

A further object of this invention is to provide a package wrapping machine having a package feeding means coordinated with and interconnected by simple mechanical linkages to a wrap sealing and severing means.

Another object of the invention is to provide a machine of the character described which is relatively simple in construction, easy to maintain in order, and relatively inexpensive.

Other objects of the invention will be apparent hereinafter from the specification and from the recital of the appended claims particularly when read in conjunction with the accompanying drawings.

In the machine illustrated in the drawings there are a vertically reciprocable upper jaw, and a fixed lower jaw. The jaws are aligned. The machine frame is adapted to carry two supply rolls of the transparent wrapping film. One roll is positioned above and to one side of the upper jaw and the other roll is positioned below and to one side of the lower jaw, though the positions of the rolls are matters of choice. The film from the lower roll is led beneath and over a roller guide, and over the lower jaw. The film from the upper roll is drawn over a guide beneath the upper jaw and is superposed on the film lying on top of the lower jaw. The upper jaw carries a heatable wire on its underside. When the upper jaw is lowered, this wire is energized and its heat seals and severs the superposed sheets of polyethylene in such manner as to seal together the two sheets for a slight distance on each side of the severing line. After the two sheets have been sealed together, the upper jaw is raised again. Then a package, which has been placed on an upper table surface of the machine frame, is fed between and just beyond the jaws by a reciprocating pusher plate. This moves the package forward against the now continuous sealed sheets of polyethylene. As the package is advanced over the lower jaw and beneath the upper jaw, the upper and lower supply rolls are positively driven to feed film, thereby permitting the package to be pushed beyond the lower jaw. The pusher plate is then retracted; and the upper jaw is lowered to wrap the sheet of film from the upper roll down over the top and right hand side of the package until the superposed films are squeezed firmly between the upper and lower jaws where they are again sealed and severed. Thus the package is covered and the cover is sealed around it at both the front and rear ends of the package, and the sheets extending between the upper and lower feed rolls are again sealed together to place a continuous sheet of film in the path of the next package which is pushed forward by the pusher plate when the latter again advances. The newly-advanced package moves the previously covered package out of the machine.

The reciprocating movements of the upper jaw and of the pusher are effected and controlled by a rotary cam. The cam is connected by a roller follower with a vertically reciprocable actuator plate which is adjustably connected to the upper jaw. The cam is detachably connected by a link to a pivoted lever which effects feed movement of the pusher. The pusher is returned to its starting position by a tension spring that is connected to the lever. The cam also serves to trip a limit switch, when the upper jaw has been lowered to operating position, causing a circuit to be closed to the heating wire.

The cam is shaped so that when the upper jaw is lowered into engagement with the lower jaw there is a dwell sufficiently long for the heated wire to sever the overlapped film sheets and to fuse them together for slight distances at both sides of the line of severance.

Referring now to the drawings by numerals of reference, 11 designates generally the packaging machine frame which comprises a plurality of vertically disposed angle irons 12 that are spaced from one another so as to define a rectangular area therebetween, and that are held in spaced relation by horizontal transversely-extending angle irons 13 and longitudinally-extending side angle irons 14. The frame 11 is reinforced at its top by welding triangularly shaped gusset plates 20 in the corners defined by the intersecting horizontal and vertical angle irons.

Secured to and extending across the machine between the vertical angle irons 12 are two oppositely disposed elongate, channel shaped plates 25. The plates 25 are connected by two parallel, vertically spaced angle irons 27 (FIGS. 1 and 2) which are welded or bolted to the plates 25 approximately midway between the sides of the frame 11.

Rigidly secured to the angle irons 27 and extending vertically therebetween is a rectangularly shaped mechanism plate 29. Secured to one side of the mechanism plate 29 is an elongate cam shaft bearing housing 34 having an axially extending bore 35, and having an outer annular flange 37 adjacent one end thereof. The housing extends slightly beyond the flange 37 to fit snugly in a circular aperture in mechanism plate 29. The annular flange 37 is secured to the mechanism plate 29 by means of screws 39 or the like.

Rotatably mounted in bushings in the bore of the housing 34 is a cam shaft 45. Shaft 45 extends at one end outwardly beyond bearing housing 34 and has mounted thereon a sprocket wheel 46, the hub of which is keyed to shaft 45. Shaft 45 at its other end extends outwardly beyond bearing housing 34 and mechanism plate 29 and has mounted thereon by means of its hub 51 a cam 50 which has a peripheral cam surface. Cam 50 may be slightly spaced axially of shaft 45 from the mechanism plate. Shaft 45 extends through and is keyed to the cam and its hub 51. A motor driven chain (not illustrated) drives sprocket 46 to rotate shaft 45 and hence the cam and hub assembly 50, 51.

Interposed between the confronting faces of mechanism plate 29 and cam 50 is an elongate actuator plate 55 which is positioned on shaft 45 and guided for vertical reciprocation with respect thereto by means of an elongate slot 56 adjacent its lower end. Rotatably mounted on actuator plate 55 adjacent the upper end of slot 56 is a roller cam follower 52 which extends outwardly from one face of the plate, and which is urged by the weight of the plate 55 and upper jaw into constant engagement with the peripheral surface of the cam. Welded in a circular aperture in the upper end of plate 55 and extending from side to side of the machine is a tube 57 which is connected by triangular shaped reinforcing gusset plates 58 to plate 55. The opposite ends of the tube 57 extend slightly beyond the opposite sides of frame 11, and have circular apertures therethrough in which are mounted the lower ends of the upper jaw actuator rods 63. The lower ends of rods 63 are threaded as at 64 and are secured to the tube 57 by conventional nut and washer combinations 65.

An upper sealing jaw, generally designated at 67 is suspended transversely of frame 11 between the reduced diameter, threaded upper ends of the actuator rods 63. Upper jaw 67 comprises a U-shaped strip of sheet metal 68 (FIG. 3) defining a deep but narrow channel. The vertical side walls of jaw 67 are maintained in spaced parallel relation by a row of annular spacers 69 which are secured between the side walls of channel 68 by screws 70. The channel side wall facing the front of frame 11 has secured to its outer face and adjacent its upper edge by means of screws 70 an elongate sheet metal plate which extends upwardly beyond the upper edge of the channel side and curves away therefrom toward the front of frame 11 to define an upper, tubular film guide 72. Secured to both outside walls of channel 68 adjacent the lower end thereof by screws 71 are two elongate plates which extend essentially the full length of channel 68, and which project slightly downwardly beyond opposite sides of the channel bottom 68' and which are bent below bottom 68' upwardly upon themselves to form lower film guides 73, 74.

The channel plate 68 is suspended from these support rods 63 by two hangers 75 (FIG. 2) which are secured, respectively, in opposite ends of the channel plate 68 and are bored to receive the upper ends of rods 63.

The under side of each hanger 75 rests upon a positioning nut 77, one of which is adjustably threaded on the upper end of each of the actuator rods 63. The hangar brackets 75 are urged downwardly against the nuts 77 by means of coil springs 79 adjustably positioned on the upper terminal ends of respective actuator rods 63, conventional washers being disposed between the springs and the upper faces of the hangers.

Carried by upper jaw 67 is a wire 85 (FIGS. 2 and 3) for heat-sealing and severing the sheets of film that are used in packaging items on the machine. This wire is suspended on the upper jaw by two inverted U-shaped levers 83, each of which straddles a respective hanger bracket 75 and is pivotally mounted thereon in such a manner that the lower ends of the legs of the U-shaped lever will be positioned slightly below the bottom 68' of channel 68. A cylindrical insulating spool 84 is mounted between the legs of each lever 83 and one end of the electrically conductive sealing wire 85 extends over each spool.

The upper end of each inverted U-shaped lever 83 is connected by a tension spring 86 to the channel 68. Springs 86 thus urge the upper ends of the levers 83 inwardly toward the ends of the channel 68 thereby stretching taut the heating wire 85 which is spaced slightly below and positioned lengthwise of channel bottom 68'. Interposed between wire 85 and the underside of channel member 68, and secured to the latter by adhesive or the like, is a hard, heat-resistant pad 87 which extends essentially the full length of the channel bottom and is rectangular in cross section.

Positioned directly below upper jaw 67 and extending parallel thereto between the upper sides of the frame 11 is the lower jaw 91. The lower jaw is mounted on an angle iron 92 (FIGS. 1 and 3), the horizontal web of which extends outwardly over each side of the frame as at 92' (FIG. 2). Angle iron 92 has adjacent its ends apertures therein in which are secured annular sleeves or bushings 93 in the bores of which are guided the vertically-positioned actuator rods 63. Angle iron 92 is secured to frame 11 by means of conventional nut and bolt combinations 94.

A channel member 96 (FIG. 3) is fastened on the top of the horizontal web of the angle iron 92; and a resilient pad 95, similar to the pad 87, is secured in this channel member in parallelism with cushion 87.

The operating mechanism for the package moving device includes the rotary cam 50. Secured approximately centrally of cam 50 and extending outwardly from one side thereof parallel to the cam hub 51 is a pin 101 (FIGS. 1, 2 and 5) which rotates in a circular path about the axis of shaft 45 as the cam 50 rotates. A link 102 has one end thereof shaped in the form of a hook 103 which is adapted to cooperate with the pin 101 during a portion of each revolution of the cam. The opposite end of the link 102 is pivotally connected by a stud 104 to a telescoping feed lever 105. Lever 105 is in turn pivotally mounted at its lower end on a stud 106 which extends outwardly from one side of the mechanism plate 29. The upper end of the telescoping feed lever 105 is pivotally secured by means of a pin 108 between the legs of an inverted U-shaped bracket 109 (FIG. 4) which is secured to and depends downwardly from the bottom of an elongate slide 110. In cross section slide 110 is in the shape of an inverted T and has its vertically disposed leg 110′ secured to the horizontal leg of an L-shaped pusher plate 111. Slide 110 is guided for horizontal reciprocation on top of frame 11 in a rectangular slot defined by two laterally-spaced angle irons 112 which are secured at their rear or left hand ends (FIG. 1) to an angle iron 113 which is supported between the sides of the frame adjacent the lower jaw 91, and which are secured at their forward or right-hand ends to a support strut 114 that extends between and is secured to the upper frame sides 14 adjacent the frame front. A tension spring 115 (FIGS. 1 and 5), which is secured at one end to the stud 104 and at its opposite end to the front of the frame 11, serves to normally urge lever 105 and hence pusher plate 111 to their respective return positions shown in FIG. 1.

Figure 6:
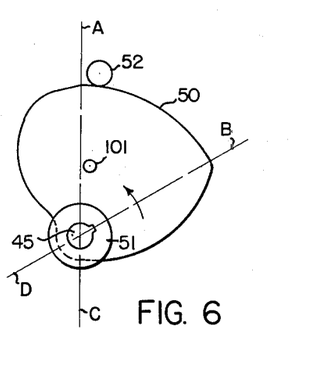
FIG. 6 is a view on a smaller scale of this cam, the cam being shown in a position corresponding to the position shown in FIG. 1.

As shown in FIG. 6, cam 50 has a peripheral surface which has two dwell portions therein. One of these dwell portions extends for 60° between the radii A and B and is a circular arc of one radius about the axis of the cam. The other dwell portion also extends for 60° and is diametrically opposite the first-described dwell portion, lying between the radii C and D. It is a circular arc about the axis of cam 50, but the radius of this latter arc is smaller than the radius of arc A—B.

Figure 1:
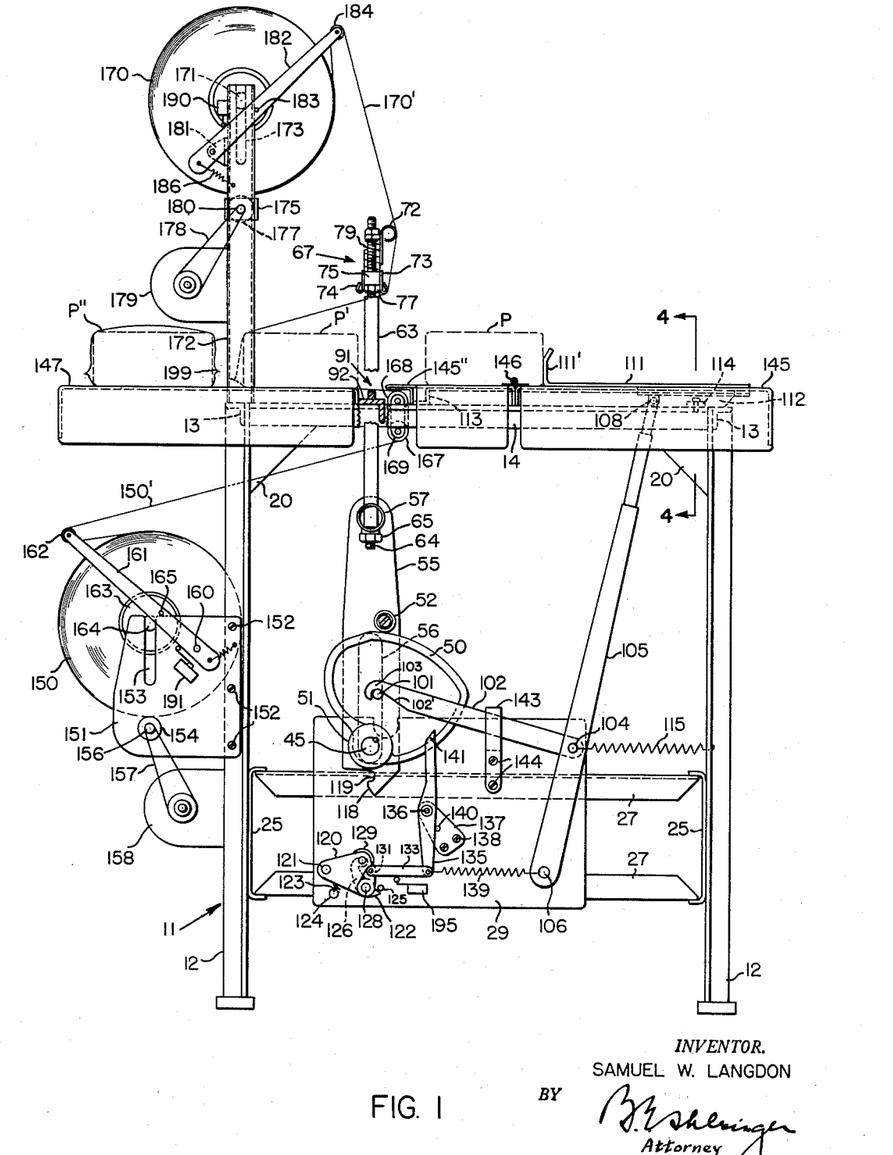
FIG. 1 is a side elevation of a wrapping machine made according to one embodiment of this invention, and showing in dash lines successive positions of packages in their travel through the machine, the package at the right being out of wrapping position, the center package having been moved to a position where it has been partially wrapped, and the package at the left having been fully wrapped.
Figure 2:
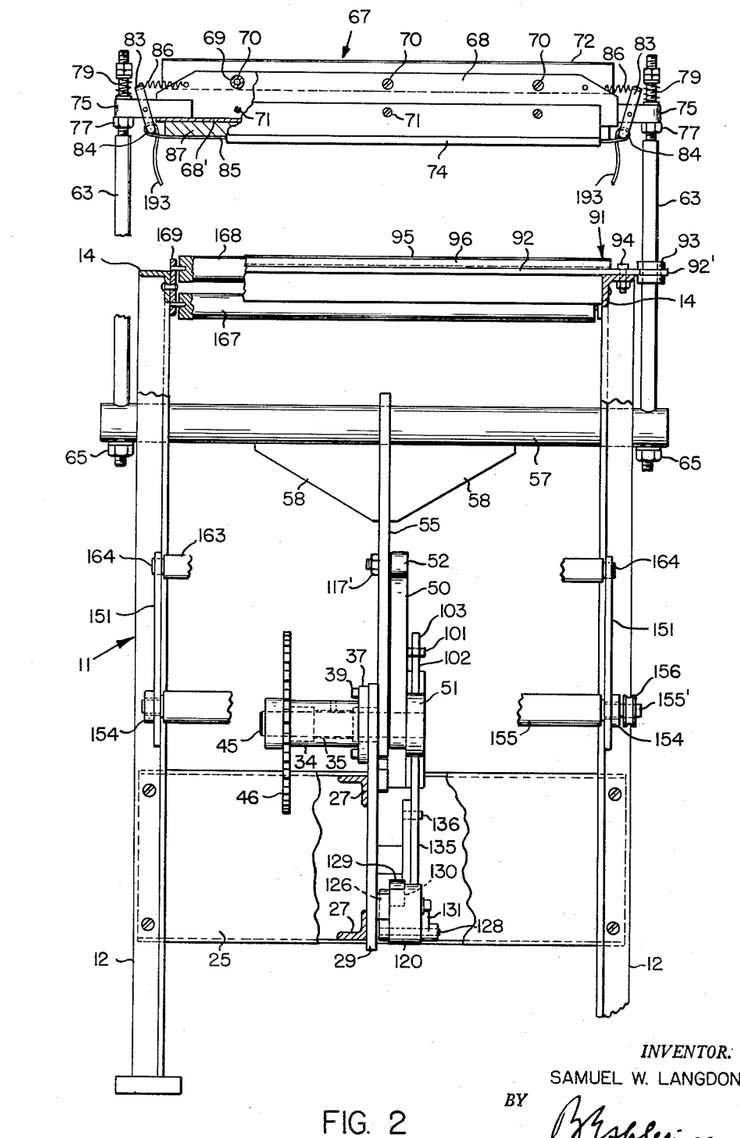
FIG. 2 is a slightly enlarged view looking at the left of FIG. 1, the view being broken away in parts more clearly to illustrate the construction.

In the position shown in FIG. 1, the hooked end 103 of link 102 is in engagement with pin 101. Therefore, as cam 50 rotates counter-clockwise from the position shown in FIG. 1, pin 101 drives the hooked actuator lever 105 and the pusher plate 111 toward the rear (left) of frame 11. This driving movement of pusher plate 111 continues for approximately 60° during which time the roller follower 52 rides along the portion A—B on cam 50, thus maintaining the upper jaw carried by actuator plate 55 in its upper position as shown in FIGS. 1 and 2, while the package is pushed by plate 111 beneath the upper jaw to the position illustrated at P′ in FIG. 1. As cam 50 rotates further, a sloping surface 102′ on the actuator link 102 engages the upper surface of cam hub 51, and the pin 101 becomes disengaged from the hook 103. Pusher plate 111 is thus disconnected from the cam 50, whereupon it is returned to its front position, shown in FIG. 1, by the spring 115 acting upon lever 105.

Concurrently with the release of link 102 from pin 101, lobe portion B—C of cam 50 engages roller follower 52 thereby permitting the latter together with actuator plate 55 and the upper jaw 67 to begin a downward movement. The lower end of actuator plate 55 has an extension at one side thereof which terminates in a hook 118 (FIG. 1) having a notch 119.

Below and essentially in line with the lower end of actuator plate 55 is an upper jaw locking means in the form of a triangularly-shaped block 120 (FIGS. 1, 2 and 5) which is pivotally mounted at one of its corners on a stud 121 secured to and extending outwardly from one side of mechanism plate 29. Block 120 has a hook-shaped extension 122 extending outwardly from a second or lower corner; and it is constantly urged counterclockwise by means of a compression spring 123 which is interposed between its lower side and an adjacent lug 124 that extends outwardly from mechanism plate 29. Spring 123 constantly urges hook 122 toward engagement with a stationary pin 125 on plate 29. A latch 126 is interposed between adjacent faces of the mechanism plate 29 and of block 120, and has a free, hooked upper end which is positioned in the path of actuator plate 55. Latch 126 is secured at its opposite or lower end to a stud 128 which is rotatably mounted in one lower corner of block 120 adjacent the hooked corner 122 of the block. The inside face of block 120 adjacent mechanism plate 29 has a notch 130 (FIG. 2) in its third or upper corner to accommodate a roller 129 (FIGS. 1, 2 and 3) which is rotatably mounted on a stud 127 in this corner of the plate in a position to be engaged by cam 50.

Shaft 128 extends outwardly beyond block 120 and has a lever 131 secured to its outwardly projecting end. The lever 131 is pivotally secured to one end of a link 133. The opposite end of link 133 is pivotally connected to the lower end of a release lever 135 which is pivotally mounted intermediate its ends to a stud 136 that extends outwardly from a plate 137 that is secured by screws 138 to mechanism plate 29. A spring 139 connected at one end to the stud 106 and at its other end to the lower end of release lever 135 normally urges release lever 135 into abutment with a stop pin 140 on plate 137. In this position latch 126 is urged upwardly in a clockwise direction until its upper hooked end is positioned in the path of the lower hooked end 118 of actuator plate 55. Simultaneously the upper end of release lever 135 is positioned in the path of pin 101.

Figures 3, 5:
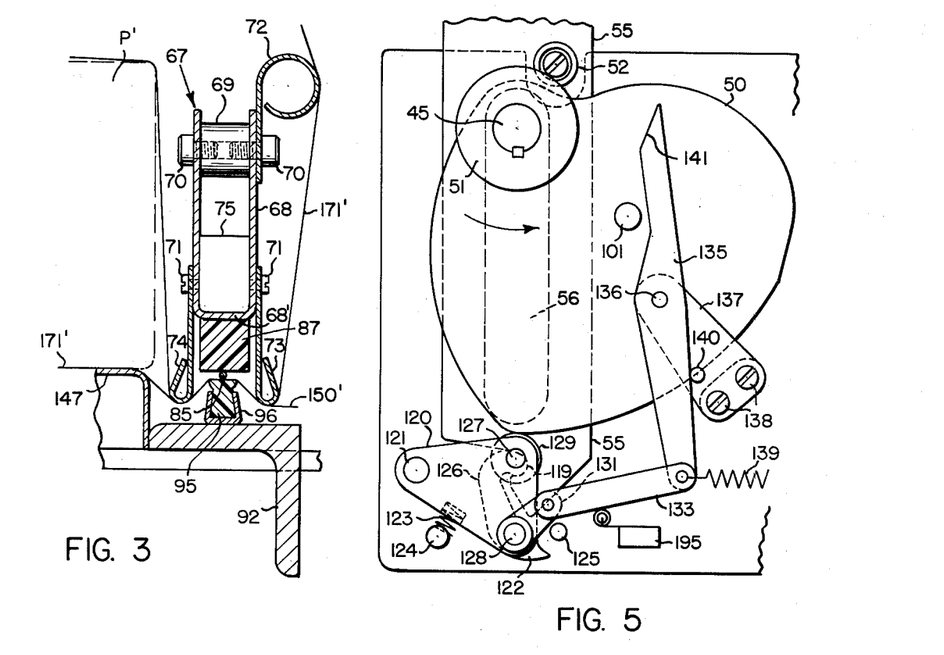
FIG. 3 is an enlarged fragmentary sectional view taken at right angles to FIG. 2 and illustrating the upper jaw of the machine lowered to carry the wrapping material down about the right end of one package and the left end of a following package, and to seal and sever the wrapping material by engagement with the lower jaw of the machine.
FIG. 5 is an enlarged view of the cam which controls the movements of the upper jaw and the intermittent feed of the packages, and of the parts associated therewith, the cam being shown in a position approximately 180° from the position shown in FIG. 1.
Figure 4:
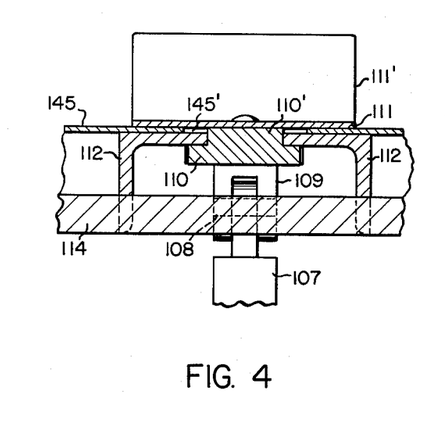
FIG. 4 is an enlarged, partial sectional view taken along the line 4—4 of FIG. 1 and looking in the direction of the arrows.

When cam 50 has rotated approximately 180° counter-clockwise from the position shown in FIG. 1, lobe portion B—C (FIG. 6) will have passed beneath roller 52, and the force of gravity will have caused the upper jaw 67 and actuator plate 55 to approach their lowermost positions where the upper jaw will be in operative relation to the lower jaw 91, and notch 119 in the hooked end 118 of actuator plate 55 will engage the hooked end of the latch 126, as shown in FIG. 5. As cam 50 rotates further, portion C—D thereof passes beneath roller 52 and portion A—B engages roller 129 and urges the entire block 120 downwardly against the resistance of spring 123 and holds it in such position for 60° of cam rotation.

As block 120 is urged downwardly, latch 126, which is engaged with the hooked end 118 of actuator plate 55, pulls the plate 55 slightly downwardly together with the upper jaw 67 so that the pressure between the engaged upper and lower jaws is increased somewhat beyond that which would be produced by the normal force of gravity. In this manner the upper and lower jaws are held securely together for a period of time sufficient to permit sealing wire 85 on the lower side of the upper jaw to perform the film sealing and severing operation.

The use of the hooks 118 and 126 serves also as a safety measure. The upper jaw 67 drops by gravity under control of cam 50 until the upper jaw is in operative relation to the lower jaw 91; and it is not until then that the positive drive through cam 50, roller 129 and engaged hooks 118, 126 takes control to effect the final, slight positive closing action of the upper jaw. If an operator should get a hand between the jaws then while the upper jaw is moving downwardly by gravity, the only pressure on his hand would be the pressure exerted by gravity. When the positive downward drive of the upper jaw takes hold, the upper jaw will be so close to the lower jaw that it will no longer be possible for a person to insert his or her hand between the jaws, so that the operator will not be injured.

After the high portion A—B of cam 50 has ridden past roller 129, the pin 101 engages the inclined upper end 141 of release lever 135 thereby moving the latter clockwise against the resistance of spring 139. Such movement of lever 135 moves link 133 to the left in FIG. 5, to thereby pivot lever 131 and the latch 126 counterclockwise to disengage the latch 126 from the notch 119 in the actuator plate 55. As the latter is released, portion D—A of cam 50 passes under roller follower 52 thereby dropping the upper jaw slightly as latch 126 is released, then elevating actuator plate 55 and the upper jaw.

When cam 50 has completed 360° of counterclockwise revolution from its position in FIG. 1 the pin 101 will have moved up the cam surface 102′ of the link 102 until the pin is again positioned in hook 103 as shown in FIG. 1, completing the packaging cycle.

Hook 103 is prevented from jumping off of pin 101 by means of a metal strap 143 which is secured at its lower end by screws 144 to one face of mechanism plate 29.

To provide a platform upon which the packages, which are to be wrapped, may be fed, a large sheet metal cover 145 is positioned over the top of frame 11 to the right of lower jaw 91. Cover 145 rests on the upper surfaces of the angle irons 112 and 113. Cover 145 has a slot 145′ (FIG. 4) therein to permit the pusher plate 111 to reciprocate. At its sides and rear, cover 145 has downwardly depending walls which overlap the frame and at its left end its top extends slightly beyond the cover side walls to define a shelf 145″ (FIG. 1) which terminates short of the lower jaw 91. Intermediate its front and rear ends, cover 145 is hinged as at 146 to permit the rear section of the cover including shelf 145″ to be swung up for access to the mechanism of the machine. A second cover 147 is positioned over the top of frame 11 to the rear (left) of the lower jaw 91. The top of cover 147 is positioned in a horizontal plane which is slightly below the top of cover 145 and approximately coplanar with the upper surface of the resilient seat 95 on the lower jaw. At its forward (right) side, front cover 147 terminates short of the jaw 91 thereby cooperating with the cover 145 to provide a transverse opening or space.

Wrapping material in the form of thin sheets or films of polyethylene or the like is supplied to the machine from positively driven upper and lower supply rolls 150, 170 (FIG. 1). The lower supply roll 150 is mounted on the rear of frame 11 and below the top thereof by means of two end plates 151, which extend outwardly from frame 11 and are secured thereto by vertically spaced nut and bolt combinations 152 or the like. This supply roll is carried on a spool 163 which has ends 164 of reduced diameter that engage in vertical slots 153 in the end plates 151. The roll is supported and driven by a roller 155 which is journaled at opposite ends in plates 151 by bearings 154 (FIG. 2). One end of roller 155 extends outwardly beyond the outer face of one of the plates 151 to provide a shaft extension which carries a pulley 156 that is connected by a belt 157 (FIG. 1) to an electric motor 158 mounted on frame 11.

Pivotally mounted on each of the end plates 151 by means of a stud 160 is a film feed regulator lever 161. The two levers 161 carry between their upper ends a film feed regulator roller 162. Feed levers 161 are free to pivot in accordance with the demand for film and to take up undesirable slack in the film or sheet 150′ supplied by roll 150. However, the downward movement of levers 161, and hence of regulator roller 162, is limited by stop pins 165 that are mounted upon each of the levers 161 intermediate their ends and that extend inwardly of the levers to engage the upper edges of the plates 151.

The sheet of film 150′ from the feed roll 150 is guided beneath regulator roller 162 and over the top thereof, under a guide roll 167, and over a guide roll 168 that is disposed vertically above guide roll 167. From guide roll 168, the sheet is drawn over the top of the lower jaw 91 and onto the rear cover 147. The two guide rolls 167 and 168 are rotatably mounted in parallel, spaced plates 169 which are pivotally secured to the upper sides of the frame just below the front cover shelf 145″.

The upper film supply roll 170 is mounted above the frame 11 between two upright tubular members 172 that are rectangular in cross section and welded at their lower ends to the upper ends of two of the vertical angle irons 12 and that serve as extensions thereof. The film supply roll 170 is carried on a spool whose ends 171 are mounted in vertical slots 173 formed in tubular supports 172 and open at their upper ends.

Mounted on the confronting faces of the tubular supports 172 at points spaced slightly below the bottoms of slots 173 are bearing blocks 175; and rotatably mounted in these bearing blocks are the reduced diameter end portions of a rubber coated feed roller 177 similar to the roller 155 employed for driving the lower film supply roller. One of such end portions extends through an aperture in one of the tubular supports 172 and carries a pulley 180 that is driven through a belt 178 or the like from an electric motor 179 which is secured to supports 172.

Each of the supports 172 has an L-shaped bracket 181 secured thereto. Pivotally secured intermediate its ends to the outwardly projecting leg of each bracket 181 is an upper feed regulator lever 182. Each lever 182 is constantly urged counterclockwise by means of a tension spring 186 secured at one end to the lever and at its opposite end to the adjacent vertical support 172. A pin 183 projecting outwardly from the side of each lever 182 intermediate its ends is positioned to engage the associated support member 172 to limit the counterclockwise movement of the levers 182.

Rotatably mounted in the free ends of levers 182 are the reduced diameter end portions of an upper film feed regulator roller 184.

Film 170′ from the upper supply roll is guided upwardly, behind and over the top of the feed regulator roller 184 and downwardly therefrom in front of the film guides 72 and 73 (FIG. 3) on the upper jaw 67, and then rearwardly beneath the upper jaw and sealing wire 85 where it is superposed above the film 150′ which was led from the lower feed roll.

Each of the motors 158 and 179, which drive the supply rolls 150, 170, has a mechanically operated electrical switch placed in series with the motor and the respective electrical supply therefor. In the case of the upper feed roll 174 a normally-closed limit switch 190 (FIG. 1) is secured to one side of a support 172 adjacent regulator lever 182, so that when the latter is in its uppermost position, as illustrated in FIG. 1, switch 190 is opened to interrupt the supply of electricity to upper motor 179 thereby halting the rotation of feed roller 177 and of the upper supply roll 170. However, whenever the tension in the upper sheet of film 171′ is such that regulator levers 182 are pivoted downwardly from their uppermost positions, lever 182 disengages limit switch 190 thereby permitting the switch to close. Motor 179 is then energized and roller 178 is positively driven to let off film from the upper supply roller.

Similarly, a normally-closed limit switch 191 is secured to one of the end plates 151 adjacent one of the lower feed levers 161. When this feed lever is in the position shown in FIG. 1, then, it opens switch 191. As in the case of the upper supply roll, however, when the tension in the film 150′ leading from the lower supply roll increases, thereby pivoting levers 161 clockwise, limit switch 191 returns to its normally closed position thus completing the circuit to the lower motor and initiating the positive drive to the lower feed roller 155 to let off film from the lower supply roll 150. The positive drives for the upper and lower supply rolls is thus controlled by the tension on the films leading from the respective rolls, and whenever such tension reaches a predetermined point as a result of lowering the upper jaw 67, or moving the pusher plate 111 forwardly against the film, either one or both of the feed rollers will be positively driven to counteract such tension and provide an adequate supply of film for wrapping the packages.

As previously noted, the sealing and severing of the superposed films occurs during the period when the high portion A—B (FIG. 5) of cam 50 engages the roller 129 on the roller block 120 and the upper and lower jaws are moved securely together. During this period, current from a source of electrical supply flows through sealing wire 85 to heat the latter so that when it is pressed down upon the superposed films by the upper jaw 67 it will fuse the films 150' and 171' together for a slight distance on each side of the wire, and at the same time it will melt completely through the superposed films immediately below and along the length of the wire thereby severing the films down the middle of the fused portion. This operation seals together the portions of the superposed films that lay at both sides of the wire.

Current is supplied to sealing wire 85 by means of wires 193 (FIG. 2) which are connected to opposite ends of the sealing wire 85. The wires 193 in turn are connected across the low voltage side of a transformer, the primary or high voltage side of the latter being connected through a normally open switch 195 (FIG. 1) to an A.C. supply. To energize wire 87 during the period the portion A—B of cam 50 is in engagement with roller 129, the normally open switch 195 is positioned to be closed by link 133 upon the downward movement of roller block 120. The switch 195 is secured to the outside of the mechanism plate 29 beneath the link 133. Normally switch 195 is not engaged by link 133 so that it remains open to interrupt the flow of current to wire 85. However, when portions A—B of cam 50 engages roller 129 and urges roller block 120 downwardly about pivot 121, link 133 is also pivoted downwardly into engagement with switch 195 to close the latter and hold it closed during 60° of rotation of cam 50, after which the spring 123 causes block 120 and hence link 133 to pivot upwardly to permit switch 192 to again open. Therefore, during each complete cycle of cam 50, switch 195 is closed during the period of engagement between the upper and lower sealing jaws, thereby heating the sealing wire 85 once during each packaging cycle. The wire is not heated except during this period.

The operation of the machine will be understood from the preceding description but may be briefly summed up here.

Assuming the parts to be in the positions shown in FIG. 1, wherein point A of cam 50 is beneath roller 52 and films 150' and 170' have been previously seamed together as described in the introduction, a package P is placed in front of the vertical leg 111' of the pusher plate. As the cam rotates 60° counter-clockwise from its position in FIG. 1, the upper jaw 67 is held in its upper position until the pusher plate has urged package P completely through the spaced jaws and against the seamed sheets of film and to the position P'. Since the package increases the tension in the sheet of film during its movement rearwardly of the machine, the upper and lower feed roll motors are energized long enough to let off quantities of film sufficient to cover the top front and bottom of the package. Further rotation of cam 50 produces release of the hooked link 102 from pin 101 to permit the return of pusher plate by spring 115 to the machine front, and results in descent of the upper jaw 67 as the cam portion B—C passes beneath roller follower 52. The descending upper jaw folds film from the upper supply roll 170 down about the back of package P' (see FIG. 3) and into engagement with film 150' on the lower jaw. At this point (FIG. 5) cam portion C—D begins to pass beneath roller 52, and the lower, hooked portion of the actuator plate 55 is engaged by the latch 126 on roller block 120 as cam portion A—B begins to engage and urge the latter downwardly to press the jaws tightly together for 60° of cam rotation. During the time that block 120 is held down by cam 50, switch 195 is closed to thereby heat wire 85 and fuse the squeezed film portions 150' and 170' together. This operation severs the films and produces a seam 199 (FIG. 1) at the rear of package P' and another distinct seam between the films 150' and 170' at the right of the line of severance. Subsequently, as the rising cam portion D—A begins to engage roller 52, and the falling cam portion B—C passes over roller block 120, rotating pin 101 causes the release of latch 126 thereby permitting the raising of the upper jaw and the oepning of switch 195 to deenergize wire 85. When the upper jaw reaches its elevated position (FIG. 1), the cycle is completed. A newly presented package at P' will in the ensuing cycle engage and move this previously wrapped package to the position P''.

Figure 7:
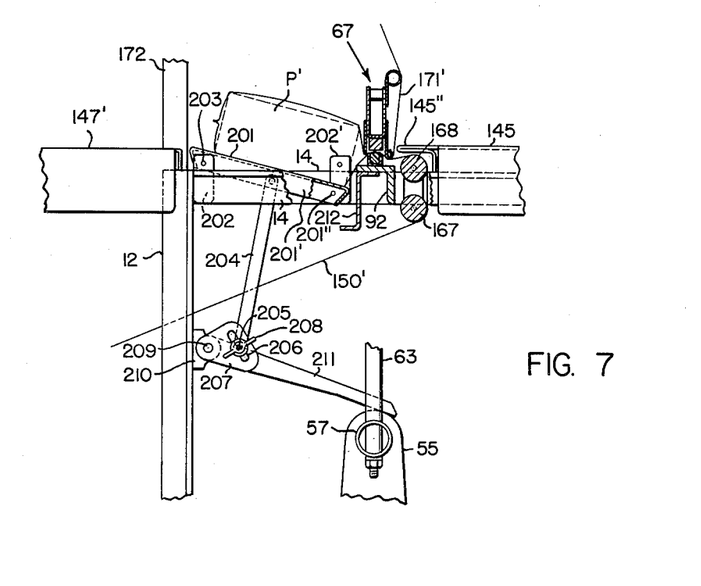
FIG. 7 is an enlarged, fragmentary side elevational view which is cut away in part, showing a modified form of machine wherein the package conveying surface adjacent the wrapping or forward side of the sealing jaws is tiltably mounted on the machine to position the wrapping material seams centrally of the package ends.
Figure 8:
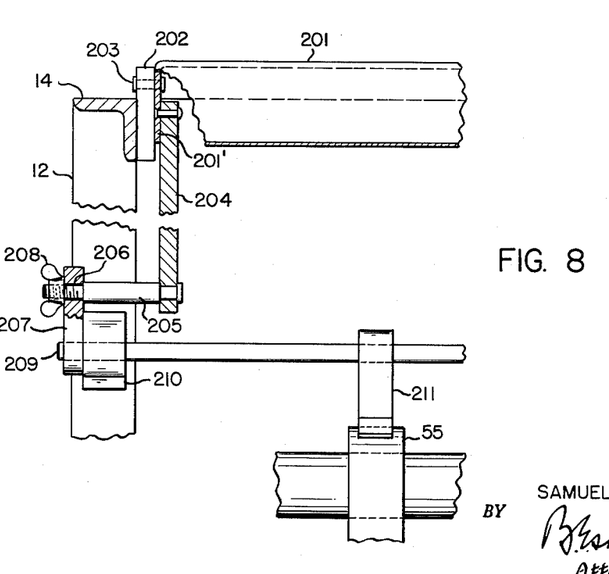
FIG. 8 is a fragmentary end view looking at the right of FIG. 7, parts being broken away.

In the modified form of machine shown in FIG. 6 instead of the one-piece rear frame cover 147 employed in the machine shown in FIG. 1, this cover or conveying surface is made in two rectangular pieces 147', 201. Part 147 is rigid with the frame, but part 201 is pivoted thereon. Secured opposite one another to the inside faces of the angle irons 14 adjacent the machine rear are two bearing plates 202, only one of which is illustrated in FIG. 7. Two similar, oppositely disposed bearing plates 202' are secured to the two angle irons 14 forwardly of plates 202 and adjacent the lower sealing jaw 91. Each of the bearing plates 202 and 202' have bored upper ends protruding above frame sides 14. Conveying surface 201 has downwardly depending sidewalls 201' which are positioned adjacent the inner faces of the plates 202 and 202' and which have holes 201'' in the opposite ends thereof. Conveying surface 201 may be mounted to pivot about either its trailing or its leading edge by inserting pivot pins 203 in, respectively, either the bores in plates 202 and the adjacent holes 201'' in the sidewalls 201', or the bores in plates 202' and the corresponding holes 201'' in sidewall 201'. In FIGS. 7 and 8 pins 203 are mounted in plates 202.

Within frame 11 at each side thereof, a link 204 is pivotally secured at its upper end to the adjacent sidewall 201' of conveying surface 201 approximately midway between the leading and trailing edges of the surface 201. At their opposite or lower ends, each of the links 204 is pivotally mounted on the inner end of a short bearing shaft 205, that is threaded at its opposite end and extends through an elongate slot 206 in the upper end of a pivot plate 207. Each of the shafts 205 is fixed in adjusted position in the associated slot 206 by means of a wing nut 208. Pivot plates 207 are fixed at their lower ends to the opposite ends of a rock shaft 209 that extends between the frame sides and which is journaled at its ends in bearing plates 210 secured on the frame. Fixed to rock shaft 209 midway between its ends is one end of a crank arm 211 which rests at its opposite end upon the upper surface of the upper jaw actuator plate 55. While a spring might be employed to urge the free end of lever 211 into constant engagement with actuator plate 55, gravitational forces are normally sufficient to maintain such engagement so that upon the descent of the plate 55 and of the upper sealing jaw 67, crank arm 211 and hence conveying surface 201 will pivot downwardly into the positions illustrated in FIG. 7 when the pivot pins 203 are mounted in the plates 202. This action causes the package P' to assume a slightly inclined postion with respect to the upper surface of frame thus elevating the place where the package seam will be formed. As actuator plate 55 subsequently ascends to elevate upper jaw 67, conveying surface 201 will be elevated through crank arm 211 into a horizontal postion to permit the next package which is advanced by pusher plate 111 to slide between the sealing jaws and onto surface 201, such advancement causing the arriving package to engage and urge the previously wrapped package onto the extending conveying surface 147'.

The extent to which the position of the package seam will be elevated will depend upon the extent to which surface 201 is pivoted downwardly from its horizontal postion. By adjusting the positions of shafts 205 longitudinally of slots 206, the radial distances between shafts 205 and their axes of rotation about shaft 209 may be altered to either increase or decrease the extent to which surface 201 is pivoted out of its horizontal position.

An elongate guard plate 212 (FIG. 6) is secured to the bottom of the lower jaw support 92 to prevent the package from slipping off of the forward conveying surface 201 when the latter pivots downwardly.

If it is desired to move the position of the seam to a point adjacent the package bottom rather than the top face of the package, one need only remove pins 203 from plates 202 and insert them through the holes in the plates 202' and the aligned holes 201'' in plate 201. The surface 201 is thus caused to pivot about its leading edge. By inserting the pins 203 in both the plates 202 and the plates 202' and in the adjacent apertures in the sidewalls 201', the conveying surface will be maintained in a horizontal position at all times, crank arm 211 being held in its elevated position where it will not be affected by the vertically reciprocating actuator plate 55.

Once the films 150' and 171' have been seamed together to provide a continuous sheet of wrapping film that extends between the upper and lower feed rolls, the packaging cycle may take place as noted above, regardless of any variation in the sizes of the packages that are conveyed by pusher plate 111 through the sealing jaws. Such variation in package size will merely result in a corresponding variation in the quantity of wrapping material which will feed off the supply rolls by the motors 158 and 179. The only restrictions on package sizes are that they be small enough so that they may be positionable on one side of the jaws in front of the pusher plate leg 111', and that they may be passed between the jaws when the upper jaw 67 is in its open or uppermost position.

Pusher plate 111 may be mounted, also to be adjustable rearwardly of the sealing jaws to permit the wrapping of longer packages. Moreover, although the polyethylene wrap is shown as seamed together only at the front and rear ends of a respective package, thereby leaving the wrap open or unseamed at the sides of the package, it is possible by turning a package 90° and running it through the machine again to seal it at both sides also, providing the width of the films is sufficient. It is also to be noted that it is intended that after the film is sealed around the package by the machine of the present invention, the package will be passed through a conventional heat tunnel to shrink the polyethylene wrap so that it is drawn down securely toward the sides of a package to prevent the contents from spilling out.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A machine for wrapping packages comprising at least two jaws movable relative to one another, means for intermittently moving a package along a predetermined path between said jaws, means for feeding wrapping material into a position transverse to the path of said moving package whereby the wrapping material is engaged by the forward end of said moving package as said package passes between said jaws, means for guiding portions of said material over the upper and lower faces, respectively, of said package during its movement through said jaws, and means for moving said jaws into operative relation with one another at the rear of the package when it has passed through said jaws, and means carried by at least one of said jaws and adapted to cooperate with the other of said jaws to seal the material about the package at the rear end of the package when said jaws are disposed in operative relation with one another, one of said jaws being mounted to move downwardly a predetermined distance by gravity toward the other of said jaws, said jaw moving means comprising means to control the rate of descent of said one jaw into operative relation with said other jaw, and means operative, after said predetermined downward movement of said one jaw, to urge said one jaw positively into operative relation with said other jaw.

2. A machine for wrapping packages having a surface over which a package is moved in a predetermined path for a predetermined distance, a support for a supply of wrapping material, means for positioning wrapping material from said support in a plane transverse to and intermediate the ends of said path, means for moving a package along said path to a position of rest at one end of said path, whereby a portion of the wrapping material is engaged by the front end of the moving package, guide means operative during the movement of said package to guide further portions of said material about, respectively, the upper and lower faces of said package, means operative when said package is in said rest position to tilt said package relative to the plane of said path so that the material beneath said package is guided upwardly behind the rear end of said package, means movable subsequent to the movement of said package to said rest position to operate the last-named means and to seal together the wrapping material over the rear face of said package, and control means operative during the sealing of said wrapping material to interrupt the operation of said package moving means.

3. A machine for wrapping packages having a support for a supply of wrapping material, spaced guide means for guiding the wrapping material from said support into a given plane, package moving means engageable with the rear face of a package and movable back and forth through the space between said guide means and between, respectively, a first position at one side of said given plane and a second position at the other side of said given plane, for moving a package into engagement with the wrapping material positioned in said given plane and into a position of rest on said other side of said plane, said package moving means when in said first position being spaced from said given plane at least a distance equal to the length of the package, said spaced guide means being operative upon movement of a package therebetween to guide further portions of said wrapping material about the upper and lower surfaces of said package, respectively, said spaced guide means including at least one jaw movable downwardly behind a package disposed in said position of rest upon movement of said package moving means back from said second position, to move said further portions of said material together to form a seam at the rear end of said package, means operative upon the downward movement of said jaw to manipulate a package disposed in said rest position for shifting said seam vertically relative to said rear end of said package, and means on said jaw for sealing said further portions of said material together along said seam upon positioning thereof around the rear end of the package.

4. A machine as defined in claim 3, wherein said means for sealing together said further portions of said material includes means for severing the wrapping material from the supply means as the wrapping material is sealed around the rear end of the package.

5. A machine for wrapping packages in heat sealable wrapping material, said machine comprising two superposed jaws, means for moving at least one of said jaws between a first position in which said jaws are in operative relation with one another and a second position in which said jaws are spaced from one another, means for moving a package forwardly through said jaws, when said jaws are spaced from one another, from a position in which said package lies wholly at one side of said jaws to a position in which it lies wholly at the other side of said jaws, and means for then returning said package moving means to starting position, means for feeding a continuous sheet of heat sealable material transversely of the path of movement of said package whereby upon said forward movement the front end of said package engages and advances said sheet through the space between said jaws and portions of said sheet extend backwardly over the top and bottom of said package and between said spaced jaws, and movable means controlling said package-moving means and said jaw-moving means to effect movement of said jaws between said two positions alternately with movement of said package moving means between its forward and return positions, said control means comprising a rotary cam having a peripheral cam surface, means operatively connecting said cam with said jaw-moving means, a pin extending outwardly from one lateral face of said cam, said pin being adapted to rotate with said cam in a circular path about the axis of rotation of said cam, a link connected at one end to said package moving means and having a hook at the opposite end thereof disposed in the path of rotation of said pin and adapted to be engaged thereby, and means on said cam for engaging and disengaging said hook from said pin at different points in the rotation of said cam, whereby upon rotation of said cam the movement of said one jaw is responsive to the contour of said peripheral cam surface, and said package moving means is operably connected to said cam during the engagement of said pin with said hooked end of said link, said one jaw being operative upon movement into operative relation with the other jaw to move said further portions of said sheet about the rear end of said package and into engagement with one another, and means carried by said one jaw for sealing said further portions together about the rear end of said package.

6. A machine for wrapping packages as defined in claim 5 having positive actuating means interposed between said cam and said one jaw, and means operative upon movement of said one jaw into said first position to operatively connect said one jaw with said positive actuating means, to thereby engage and hold the engaged portions of such sheets under pressure between said jaws while said one jaw is in said first position.

7. A machine for wrapping packages as defined in claim 6 wherein means is provided operative by said cam to disengage said positive actuating means from said one jaw immediately before movement of said one jaw from said first position to said second position.

8. A machine for wrapping packages as defined in claim 5 wherein said means for feeding a continuous sheet of heat sealable material comprises two, spaced supply rolls about each of which is wound a respective end of said continuous sheet, independent driving means for positively driving each of said supply rolls, and means interposed between each of said driving means and its respective supply roll and responsive to the tension in said continuous sheet to selectively actuate the driving means for a respective supply roll.

9. A machine for wrapping packages as defined in claim 5 wherein said sealing means comprises an electrically conductive wire extending the length of and disposed centrally of said one jaw and having means operable during the engagement of said jaws to pass current through said wire, whereby said wire is heated thereby to fuse together said further portions of said sheet to define a seam of appreciable width and to melt completely through said further portions medially of said seam.

10. A machine for wrapping packages comprising a frame, a stationary lower jaw secured to and extending between the sides of said frame, table surfaces mounted on said frame at opposite sides of said lower jaw, a movable upper jaw superposed on said frame above said lower jaw, driving means operatively connected to said upper jaw to intermittently move said upper jaw between a lower position and an upper position and to cause said upper jaw to dwell for predetermined lengths of time in both positions, package moving means operable to intermittently engage and move a package forwardly from a position of rest on the table surface at one side of said lower jaw between said jaws to a position of rest on said table surface at the other side of said lower jaw, means for feeding a continuous sheet of heat sealable wrapping material across the path of movement of the package, means operable upon movement of said upper jaw to said upper position to connect said driving means with said package moving means to actuate the latter to move the package engaged thereby forwardly, whereby the front face of said package engages said sheet and carries portions thereof over the top and bottom of said package, said driving means being operative subsequent to the positioning of said package on said table surface at said other side of said lower jaw to disconnect said driving means from said package moving means, means operative thereupon to return said package moving means to initial position, and means operative upon movement of said upper jaw to its lower position for sealing together the portions of said sheet at the rear of said package.

11. A machine for wrapping packages as defined in claim 10 wherein said table surface at said other side of said lower jaw is pivotally mounted at one edge thereof along a line extending parallel to said lower jaw, and means connecting the last-named table surface and said driving means to pivot said last-named surface into and out of coplanar relation with the upper surface of said lower jaw, upon movement of said upper jaw to its upper and lower positions, respectively.

12. A machine for wrapping packages as defined in claim 10 wherein said upper jaw is resiliently mounted between the legs of a U-shaped frame which has its base disposed beneath said lower jaw and which is operatively connected with said driving means to move said upper jaw between its upper and lower positions, latching means positioned in the path of movement of said U-shaped frame, a hook shaped extension secured to the base of said frame to engage said latching means upon movement of said upper jaw into operative relation with said lower jaw, said driving means being operative upon engagement of said latching means with said hook extension to move said U-shaped frame in a direction to press the upper jaw firmly toward the lower jaw to squeeze the wrapping material between said jaws, and means operable by said driving means to disengage said latching means from said hooked extension immediately before return of said upper jaw to its upper position.

13. A machine for wrapping packages as defined in claim 12 wherein said sealing means comprises an electrically conductive wire positioned on the lower surface of said upper jaw, and means positioned to be operated by said latching means, upon engagement of said latching means with said hooked extension, to close a circuit to said wire to pass current therethrough.

14. A machine for wrapping packages comprising a stationary lower jaw, an upper jaw reciprocable toward and from said lower jaw from an upper position to a lower position, pushing means, means for effecting forward and return movements of said pushing means, respectively, to push a package through said jaws when said upper jaw is in its upper position and to return said pushing means to starting position, means for positioning a heat-sealable wrapping material in the path of movement of the package and over said lower jaw, whereby, on the forward stroke of said pushing means, the front end of the package engages the wrapping material and carries it over the top and bottom of the package, means operative upon movement of said upper jaw to its lower position to carry the wrapping material around the rear end of the package, means controlling the movements of said upper jaw and of said pushing means whereby said upper jaw is moved toward and from said lower jaw and dwells at the end of both movements, and said pushing means receives a forward and return stroke while said upper jaw is dwelling in its upper position, and said pushing means dwells in its returned, starting position while said upper jaw is moving between its upper and lower positions and is in its lower position, a heating member carried by one of said jaws, and means operative while said upper jaw is dwelling in its lower position for closing a circuit to said heating member to fuse the wrapping material together at the rear end of the package.

15. A machine for wrapping packages as claimed in claim 14 having means for pressing said upper jaw toward said lower jaw to hold the wrapping material between the jaws under load during the fusing operation.

16. A machine for wrapping packages as claimed in claim 15 wherein said heating member, when heated also operates to sever the wrapping material approximately midway of the width of the fused portion thereof.

17. A machine for wrapping packages comprising a fixed lower jaw, an upper jaw reciprocable toward and from said lower jaw between an upper and a lower position, separate means for supporting, respectively, two rolls of heat-sealable wrapping material, means for guiding the wrapping material from one of said rolls from one side of said upper jaw under said upper jaw, means for guiding the wrapping material from the other of said rolls from the corresponding side of said lower jaw over said lower jaw, an electric sealing and severing wire mounted on the lower face of said upper jaw to extend transversely of the machine, means for pushing a package forwardly from said one side of said lower jaw through the space between said jaws when said upper jaw is in its upper position, and for then returning the pushing means to starting position, means for closing a circuit to said wire when said upper jaw is in its lower position to seal the free ends of the wrapping materials from the two rolls together so that the connected wrapping material extends across the path of forward movement of a package pushed by said pushing means and the front end of the package engages the connected wrapping material and carries it over the top and bottom surfaces of the package during the forward movement of the package, means controlling the movements of said upper jaw and of said pushing means so that said upper jaw descends to its lower position, dwells there for a time, returns to its upper position and dwells there for a time in a cycle of operation and so that said pushing means has a forward stroke and a return stroke while said upper jaw is in its upper position and dwells at its starting position while said upper jaw is moving between its upper and lower positions and is dwelling in its lower position, and guide means carried by said upper jaw for carrying the connected wrapping material around the rear end of a package during descent of said upper jaw to its lower position, whereby said wire when heated operates to sever the connected pieces of wrapping material from the two rolls while fusing the two pieces together around the rear of the package and at one side of the line of severance and while fusing the two pieces of wrapping material from the two rolls together at the other side of said line of severance to connect the two ends of the wrapping materials together again.

18. A wrapping machine as claimed in claim 17, having means for forming said upper jaw and said wire under pressure into engagement with the wrapping material between the jaws at the lower end of the stroke of said upper jaw.

19. A machine for wrapping packages comprising a stationary lower jaw, and a vertically movable upper jaw, which is movable from an upper position in which it is spaced from said lower jaw to a lower position in which it is in operative relation with said lower jaw, means for moving a package between said jaws from one side to the other while said movable jaw is in its upper position, means for positioning a continuous sheet of heat-sealable wrapping material in the path of said moving package whereby a portion of said sheet is engaged and moved through said spaced jaws by the forwar end of said moving package and further portions of said sheet are carried rearwardly of said moving package about, respectively, the top and bottom of said package and between said spaced jaws, said upper jaw being mounted to move downwardly by gravity, movable control means controlling said downward movement, means operative when said upper jaw is in operative relation to said lower jaw to press said upper jaw positively toward said lower jaw thereby to engage the wrapping material between said jaws under pressure, and means for moving said control means.

References Cited in the file of this patent
UNITED STATES PATENTS

| | | |
|---|---|---|
| 2,649,672 | Thompson | Aug. 25, 1953 |
| 2,690,633 | Denton | Oct. 5, 1954 |
| 2,741,885 | Allison | Apr. 17, 1956 |
| 2,947,127 | Herman | Aug. 2, 1960 |